July 30, 1957
A. D. JORDAN
2,801,333
SELF CALIBRATING LIMIT INDICATOR
Filed March 12, 1953
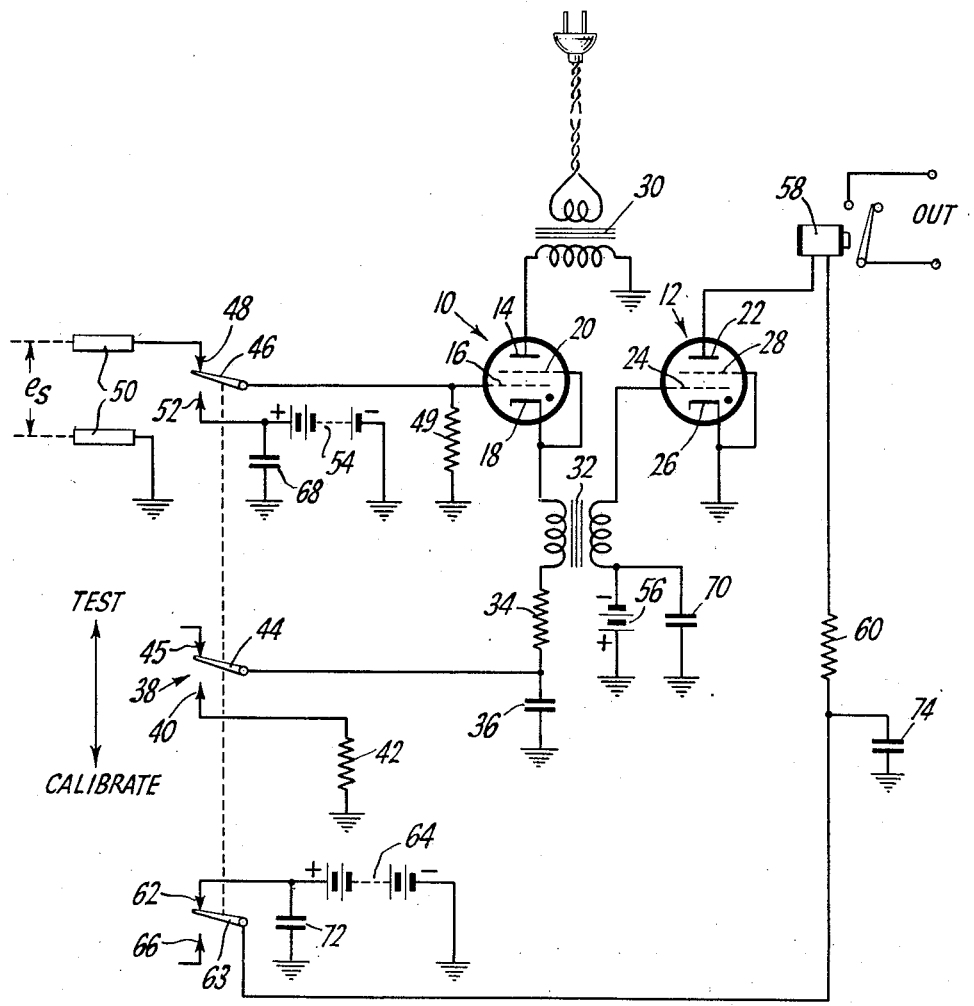
INVENTOR
ARCHIE DEAN JORDAN
BY
*Michael Hertz*
ATTORNEY _United States Patent Office_

2,801,333
Patented July 30, 1957

2,801,333

SELF-CALIBRATING LIMIT INDICATOR

Archie Dean Jordan, Emporium, Pa., assignor to Sylvania Electric Products Inc., a corporation of Massachusetts Application March 12, 1953, Serial No. 341,950

14 Claims. (Cl. 250—27)

This invention relates to an electronic testing instrument, particularly for determining whether unknown voltages exceed that of a secondary standard, the secondary standard, between tests, being calibrated against a primary standard.

It is an object of this invention to provide in such an instrument a circuit that will not require the operator, from time to time, in order to recheck the secondary standard against the primary, to operate separate switches or any switch other than the single ganged switch employed to make the test.

It is a further object to simplify the construction of such an instrument by dispensing with the usual hand setting of a potentiometer to adjust a secondary voltage source to accord with a primary potential source. This is done in instruments of this type to prevent excessive drain on the primary source.

It is a still further object of the invention to provide an instrument which shall be trouble-free over a long period of operation and be rugged, this being effected, in part, by the elimination of meters and delicate contacts.

Still further, it is an object of the invention to provide an instrument which shall, without any determination on the part of the operator, separate acceptable units under test from those which are not.

Other and further objects will be clear after consideration of the detailed description which follows when taken in conjunction with the accompanying drawing which is a circuit diagram incorporating my invention.

In the figure, 10 and 12 are two grid controlled gas filled tubes, the tube 10 having a plate 14, control grid 16 and cathode 18. A second grid 20 of the tube, for the application herein set forth, is tied to the cathode. Similarly, the tube 12 has a plate 22, control grid 24, cathode 26, and cathode connected second grid 28. Each of the tubes, in addition, has a heating filament, not illustrated.

The plate circuit of the tube 10 includes the secondary of an isolation transformer 30, the primary of which is connected to an alternating current supply which may be a single phase, 117 volt, 60 cycle source. One leg of the secondary is connected to a common bus or ground and the other leg is connected to the plate 14. In lieu of the A. C. supply, a periodic intermittent D. C. supply may be used. The cathode 18 is connected via the primary of a transformer 32 to a resistor 34, the opposite end of which is connected to a plate of a condenser 36; the opposite plate of this condenser is connected to the common bus or ground. The primary of transformer 32 of course sees the load on the plate circuit. The testing instrument also has a ganged switch 38, one fixed contact 40 of which is connected to a second resistor 42. The opposite end of the resistor 42 is connected to ground. The switch has a normal test position and a calibrate position. When the switch is shifted to calibrate position, the resistor 42 shunts the condenser 36. The time constant of the RC combination consisting of the resistance 34, condenser 36 and resistance 42 is much longer than the time of a cycle of the alternating current supply. The pole 44 of the switch in the test position is against an inactive contact 45. A second pole 46 of the switch is connected to the grid 16 and a high resistance grid leak 49. In the test position of the switch the pole 46 is in engagement with contact 48 leading to one of a pair of contact strips 50 to which the test voltage $e_s$ is applied, the other contact strip of the pair being connected to the common bus or ground. In the calibrate position of the pole 46, the pole is in engagement with contact 52, which contact is connected to the positive end of a calibrating D. C. source, which, for simplicity of illustration, is shown as a battery 54 although a regulated electronic voltage supply well known in the art could be the source normally used. The opposite end of the D. C. source is grounded. In lieu of the D. C. source, A. C. may be utilized provided it had the same frequency as and was properly phased with the A. C. applied to the plate.

The secondary of the transformer 32 is connected at one end to the grid 24 of gas tube 12 and at its other end to a cut-off biasing voltage here shown as the negative end of battery 56, although in actual use the source could be a suitable electronic rectifier with output voltage control to enable the bias to be adjusted at will in accordance with the characteristic of the tube 12. The opposite end of the battery is connected to the common ground. The winding of the secondary of transformer 32 is so phased that a positive pulse will be transmitted to the grid 24 of tube 12 on the tube 10 becoming conductive. The plate circuit of the gas tube 12 has included in it a relay 58 and a current limiting resistor 60 leading to a third pole 63 of the switch. In the test position of this pole, it engages contact 62 connected with the positive end of a D. C. source, here shown as a battery 64. The opposite end of the D. C. source is grounded. In the calibrate position of the pole 63, it engages an idle contact 66. The contacts of the relay control an outside circuit, not shown, to operate instrumentalities for operating an indicator or to control a selector mechanism which will pass or reject according to the test conditions selected devices under test and which fail to come up to the requisite value required to cause the tube 10 to fire.

The devices applied to the terminals 50 may be voltage supplying devices such as batteries or devices such as resistors or tube elements across which a potential drop may occur. In the latter case, means within the test instrument or outside of it may be provided for causing current flow through the devices.

The switch may be provided with a delay means to prevent shifting of the switch to calibrate position for a time sufficient for the device under test to pass beyond the selector mechanism.

To ensure more reliable operation of the device, condensers 68, 70, and 72 are placed across the various D. C. potential sources, as shown. These condensers are rather large and are utilized to filter out any spikes in the voltage supplies which may cause erroneous operation of the instrument.

Condenser 74 may or may not be used. Its purpose is to prolong the firing of the tube 12 after the switch 38 is opened.

The device operates as follows:

When the ganged test switch 38 is momentarily shifted to the lower calibrate position, the positive potential of voltage source 54 is applied to the grid 16 of tube 10 through the switch contact 52 and pole 46. For purposes of illustration assume the applied voltage to be 27 volts and the cut-off for tube 10 to be minus 2 volts. As a result of this, tube 10 conducts on the positive half cycles of the alternating current supplied through the transformer 30. Thus pulses of current will flow through the tube, through the primary of transformer 32, the resistor 34, condenser 36 and back to the transformer 30, thereby charging the condenser. Also some of the pulse or charge will leak off through the resistor 42 via the pole 44 and contact 40, particularly after the calibrate voltage was reduced by the operator. When the charge in the condenser reaches cut-off potential, i. e. 29 volts, the tube will no longer fire. The pulses through the primary of transformer 32 are, during this charging period of the condenser 36, ineffective to fire tube 12 since the plate voltage of that tube is held off by reason of pole 63 of the switch being in contact with nonconnected contact 66. As soon as gang switch 38 is released it moves to its test position. The resistor 49 at this time prevents the grid 16 from floating with consequent misfiring of the tube.

Now if the voltage under test applied to the grid via contact 48 and pole 46 be equal to or less than the calibrate voltage, the 29 volts on the condenser 36 and cathode, compared to the 27 volts or less on the grid, would maintain the grid at cut-off and thus no pulse would appear at the transformer 32. Should, however, the test voltage exceed the calibrate voltage, the tube again becomes conductive, and an additional charge is placed on the condenser 36 incidentally creating a pulse in the transformer 32. Since at this time plate current is being supplied to the tube 12 via contact 62 and pole 63 and the grid 24 receives a positive pulse sufficient to overcome the negative bias normally on the grid 24, the tube 12 is rendered conductive thereby closing the contacts of relay 58. The condenser 74 will maintain the conductive condition of the tube for an interval of time should the switch 38 be shifted to calibrate position immediately after it had been released to its test position. The relay 58 may control an indicator or selector mechanism as desired.

A unit under test can be selected within any desired limits by subjecting units which effect firing of tube 12 in the first test to a second test in the same or another like test instrument wherein the calibrate voltage is set to a higher second limit desired. Then if the unit effects firing of tube 12 in the first test but not in the second, it falls within the desired limits.

It is obvious that the values to be assigned to the different components would vary with different types of tubes, applied voltages to electrodes, etc. For example with plate voltages in the neighborhood of 400 volts applied to tube 10, voltages far exceeding the example given above may be tested. Therefore, it is without intending to be restricted to the specific values hereinafter set forth but merely as an engineering aid that the following data are given.

| | |
|---|---|
| A. C. source | 117 volts, 60 cycle. |
| Transformer 30 | 1:1 isolation transformer. |
| Transformer 32 | 1:2 audio type transformer. |
| Tubes 10 and 12 | Type 2050 or 2D21. |
| Plate voltage, tube 12 | 150 volts D. C. |
| Hold-off volts, tube 12 | Approximately —4.5 volts. |
| C36 | 8 mfd. |
| C68 | 50 mfd. |
| C70 | 100 mfd. |
| C72 | 16 mfd. |
| C74 | 50 mfd. |
| R34 | 33K ohms. |
| R42 | 68K ohms. |
| R49 | 5 megohms. |
| R60 | 1000 ohms, 10 watt. |

What I claim as new is:

1. A test instrument comprising a gas filled tube having an anode, a control grid and a cathode, a grid circuit for the tube, an anode circuit for the tube, a resistor, a condenser, and an impedance, all in series relation, connected to the cathode of the tube, means for applying to the anode circuit an intermittent source of electrical energy, a direct current source providing a calibrating voltage, terminal means to which may be applied a device providing a test voltage, and a contrivance for successively connecting the calibrating voltage and the terminal means to the grid circuit with the positive end of the calibrating voltage connectible to the grid.

2. A test instrument comprising a gas filled tube having an anode, a control grid and a cathode, a grid circuit for the tube, an anode circuit for the tube, a resistor, a condenser, and an impedance, all in series relation, connected to the cathode of the tube, a second resistor adapted to shunt the condenser, means for applying to the anode circuit an intermittent source of electrical energy, a direct current source providing a calibrating voltage, terminal means to which may be applied a device providing a test voltage, and a contrivance for selectively and simultaneously connecting the calibrate voltage to the grid circuit, with the positive end of the calibrating voltage applied to the grid, and the second resistor in shunt relation to the condenser and for connecting the terminal means, solely, to the grid.

3. A test instrument comprising a gas filled tube having an anode, a control grid and a cathode, a grid circuit for the tube, an anode circuit for the tube, a resistor, a condenser, and an impedance, all in series relation, connected to the cathode of the tube, means for applying to the anode circuit an intermittent source of electrical energy, a direct current source providing a calibrating voltage, a high value resistor effectively permanently interconnected between the grid and the cathode of the tube, terminal means to which may be applied a device providing a test voltage, and a contrivance for successively connecting the calibrating voltage and the terminal means to the grid circuit with the positive end of the calibrating voltage applied to the grid.

4. A test instrument comprising a gas filled tube having an anode, a control grid and a cathode, a grid circuit for the tube, an anode circuit for the tube, a resistor, a condenser, and an impedance, all in series relation, connected to the cathode of the tube, means for applying to the anode circuit an intermittent source of electrical energy, a direct current source providing a calibrating voltage, a large capacitor connected across the calibrating voltage source so as to prevent any sharp changes in voltage of the source from reaching the grid when the calibrate voltage is applied to the grid, terminal means to which may be applied a device providing a test voltage, and a contrivance for successively connecting the calibrating voltage and the terminal means to the grid circuit with the positive end of the calibrating voltage applied to the grid.

5. A test instrument comprising a gas filled tube having an anode, a control grid and a cathode, a grid circuit for the tube, an anode circuit for the tube including the secondary of a first transformer connected to anode and ground, and a series combination of a primary of a second transformer, a resistor and a condenser connected between cathode and ground, the primary of the first transformer being adapted to be energized from any suitable source of current and the secondary of the second transformer being connected with an output circuit, a direct current source providing a calibrating voltage, terminal means to which may be applied a device providing a test voltage, and a contrivance for successively connecting the calibrating voltage and the terminal means to the grid circuit with the positive end of the calibrating voltage applied to the grid.

6. A test instrument comprising a gas filled tube having an anode, a control grid and a cathode, an anode circuit for the tube including the secondary of a first transformer connected to anode and ground, and a series combination of a primary of a second transformer, a resistor and a condenser connected between cathode and ground, the primary of the first transformer being adapted to be energized from any suitable source of current and the secondary of the second transformer being connected with an output circuit, a second resistor adapted to shunt the condenser, a direct current source providing a calibrating voltage, terminal means to which may be applied a device providing a test voltage, and a contrivance for selectively and simultaneously connecting the calibrate voltage to the grid circuit and the second resistor in shunt relation to the condenser with the positive end of the calibrating voltage connected to the grid and for connecting the terminal means, solely, to the grid.

7. A test instrument comprising a gas filled tube having an anode, a control grid and a cathode, anode circuit for the tube including the secondary of a first transformer connected to anode and ground, and a series combination of a primary of a second transformer, a resistor and a condenser connected between cathode and ground, the primary of the first transformer being adapted to be energized from any suitable source of current and the secondary of the second transformer being connected with an output circuit, a second resistor adapted to shunt the condenser, a direct current source providing a calibrating voltage, terminal means to which may be applied a device providing a test voltage, and a double-pole double-throw switch for selectively and simultaneously connecting the calibrating voltage to the grid circuit and the second resistor in shunt relation to the condenser with the positive end of the calibrating voltage connected to the grid or for connecting the terminal means, solely, to the grid.

8. A test instrument comprising a first gas filled tube having an anode, a control grid and a cathode, a grid circuit for the tube, an anode circuit for the tube; a resistor, a condenser, and an impedance, all in series relation, connected to the cathode of the tube, means for applying to the anode circuit an intermittent source of electrical energy, a direct current source providing a calibrate voltage, terminal means to which may be applied a device providing a test voltage, and a contrivance for successively connecting the calibrate voltage and the terminal means to the grid circuit of the first tube, with the positive end of the calibrate voltage applied to the grid, a second grid controlled gas filled tube having its grid circuit coupled with the impedance in the anode circuit of the first tube, means normally biasing the second tube to cut-off, and an output device in the anode circuit of the second tube.

9. A test instrument comprising a first gas filled tube having an anode, a control grid and a cathode, a grid circuit for the tube, an anode circuit for the tube; a resistor, a condenser, and an impedance, all in series relation, connected to the cathode of the tube, means for applying to the anode circuit an intermittent source of electrical energy, a direct current source providing a calibrate voltage, terminal means to which may be applied a device providing a test voltage, a second grid controlled gas filled tube having its grid circuit coupled with the impedance of the first tube, means normally biasing the second tube to cut-off, an output device in the plate circuit of the second tube, and a switch to selectively and simultaneously connect the calibrate voltage to the grid circuit of the first tube with the positive end of the calibrate voltage applied to the grid and to break the application of direct current potential to the anode circuit of the second tube and to simultaneously connect the terminal means to the grid circuit of the first tube and connect the direct current source to the anode circuit of the second tube.

10. A test instrument comprising a first tube having an anode, a control grid and a cathode, a grid circuit for the tube, an anode circuit for the tube; a resistor, a condenser, and an impedance, all in series relation, connected to the cathode of the tube, means for applying to the anode circuit an intermittent source of electrical energy, a direct current source providing a calibrate voltage, terminal means to which may be applied a device providing a test voltage, and a contrivance for successively connecting the calibrate voltage and the terminal means to the grid circuit of the first tube, with the positive end of the calibrate voltage applied to the tube, a second grid controlled gas filled tube having its grid coupled with the impedance in the anode circuit of the first tube, means normally biasing the second tube to cut-off, capacitive means shunting said biasing means, and an output device in the anode circuit of the second tube.

11. A test instrument comprising a first tube having an anode, a control grid and a cathode, a grid circuit for the tube, an anode circuit for the tube; a resistor, a condenser, and an impedance, all in series relation, connected to the cathode of the tube, means for applying to the anode circuit an intermittent source of electrical energy, a direct current source providing a calibrate voltage, terminal means to which may be applied a device providing a test voltage, and a contrivance for successively connecting the calibrate voltage and the terminal means to the grid circuit of the first tube, with the positive end of the calibrate voltage applied to the tube, a second grid controlled gas filled tube having its grid coupled with the impedance in the anode circuit of the first tube, means normally biasing the second tube to cut-off, an output device in the anode circuit of the second tube, and a condenser effective to discharge into the anode circuit of the second tube.

12. A test instrument comprising a gas filled tube having an anode, a control grid and a cathode, a grid circuit for the tube, an anode circuit for the tube; a resistor, a condenser, and an impedance, all in series relation, connected to the cathode of the tube, means for applying to the anode circuit an intermittent source of electrical energy, a direct current source providing a calibrating voltage, terminal means to which may be applied a device providing a test voltage, and a contrivance for successively connecting the calibrating voltage and the terminal means to the grid circuit with the positive end of the calibrating voltage applied to the grid, a second grid controlled gas filled tube whose grid circuit is coupled with the impedance in the anode circuit of the first tube, an output device in the output circuit of said second tube, and the contrivance including means to apply anode voltage to the second tube only when the test voltage is being applied to the first tube.

13. A test instrument comprising a gas filled tube having an anode, a control grid and a cathode, a grid circuit for the tube, an anode circuit for the tube; a resistor, a condenser, and an impedance, all in series relation, connected to the cathode of the tube, means for applying to the anode circuit an intermittent source of electrical energy, a direct current source providing a calibrating voltage, terminal means to which may be applied a device providing a test voltage, and a contrivance for successively connecting the calibrating voltage and the terminal means to the grid circuit with the positive end of the calibrating voltage applied to the grid, a second grid controlled gas filled tube whose grid circuit is coupled with the impedance in the anode circuit of the first tube, means for applying a fixed negative bias to the grid of said second tube, an output device in the output circuit of said second tube, and the contrivance including means to apply anode voltage to the second tube only when the test voltage is being applied to the first tube.

14. A test instrument comprising a first gas filled tube having an anode, a control grid and a cathode, a grid circuit for the tube, an anode circuit for the tube; a resistor, a condenser, and an impedance, all in series relation, connected to the cathode of the tube, a second resistor adapted to shunt the condenser, means for applying to the anode circuit an intermittent source of electrical energy, a direct current source providing a calibrate voltage, terminal means to which may be applied a device providing a test voltage, a second grid controlled gas filled tube having its grid circuit coupled with the impedance in the cathode circuit of the first tube, means normally biasing the second tube to cut-off, an output device in the anode circuit of the second tube, a source of direct current potential for the anode circuit of the second tube, and a switch to selectively and simultaneously connect the calibrate voltage to the grid circuit of the first tube, with the positive end of the calibrate voltage applied to the grid, connect the second resistor across the condenser in the anode circuit and to break the application of direct current potential to the anode circuit of the second tube and to simultaneously connect the terminal means to the grid circuit of the first tube, disconnect the second resistor from across the condenser in the anode circuit and connect the direct current source to the anode circuit of the second tube.

References Cited in the file of this patent
UNITED STATES PATENTS

| | | |
|---|---|---|
| Re. 22,794 | Deakin | Oct. 1, 1946 |
| 1,871,787 | Goldsborough | Aug. 16, 1932 |
| 2,313,666 | Peterson | May 9, 1943 |
| 2,377,363 | Noble | June 5, 1945 |
| 2,433,845 | Hayes et al. | Jan. 6, 1948 |
| 2,434,822 | Van Beuren et al. | Jan. 20, 1948 |
| 2,497,681 | Mayer | Feb. 14, 1950 |
| 2,511,628 | Elliot | June 13, 1950 |